(No Model.)
J. D. BARRON.
FERTILIZER DISTRIBUTER.
No. 456,933. Patented Aug. 4, 1891.
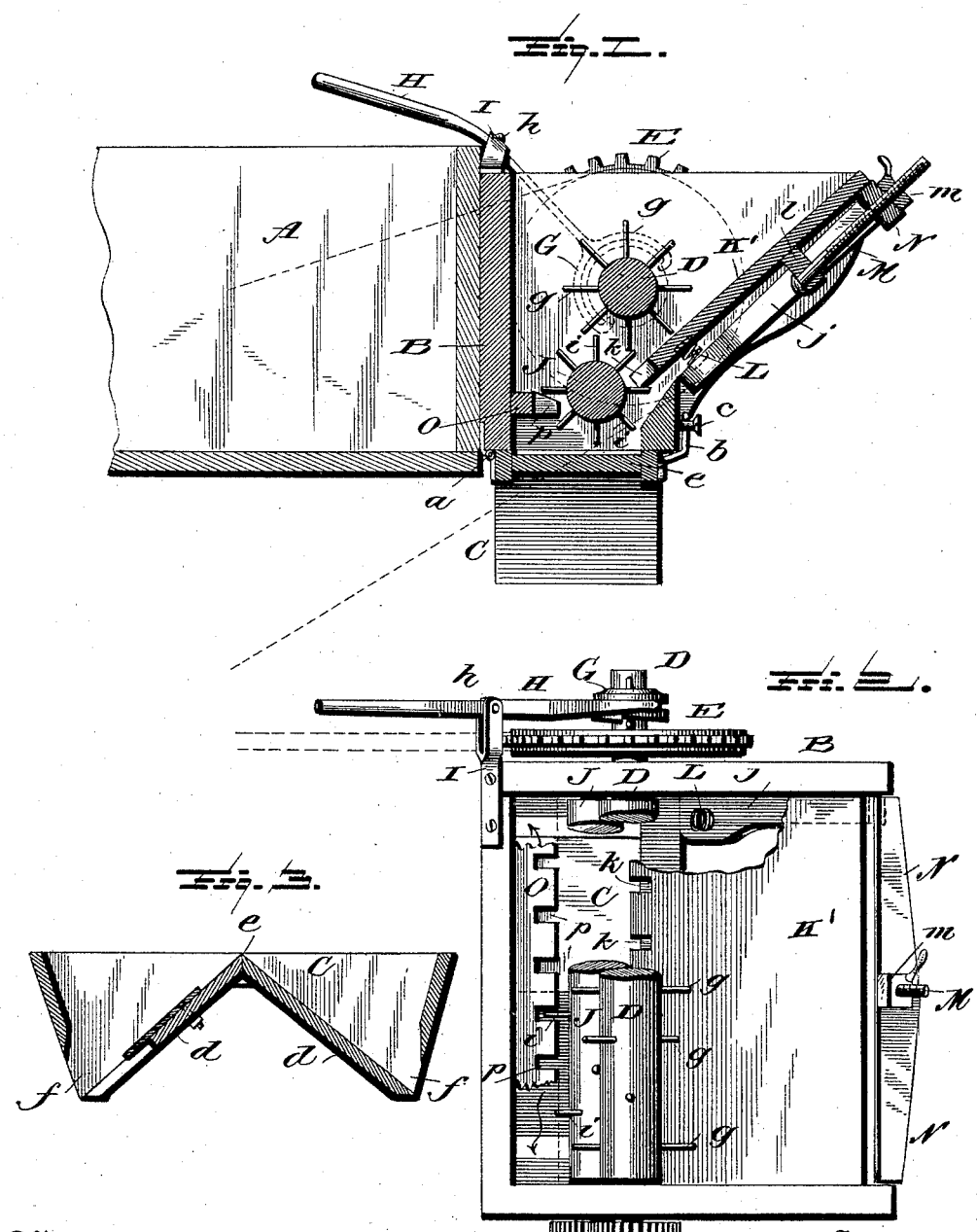
Witnesses
L. C. Hills.
E. H. Boyd
Inventor
John D. Barrow.
per Chas. H. Fowler
Attorney

UNITED STATES PATENT OFFICE.

JOHN DAVIS BARRON, OF NEAR CALVERT, TEXAS.

FERTILIZER-DISTRIBUTER.

SPECIFICATION forming part of Letters Patent No. 456,933, dated August 4, 1891.

Application filed April 29, 1891. Serial No. 390,979. (No model.)

*To all whom it may concern:*

Be it known that I, JOHN DAVIS BARRON, a citizen of the United States, residing at near Calvert, in the county of Robertson and State of Texas, have invented certain new and useful Improvements in Fertilizer-Distributers; and I do hereby declare that the following is a full, clear, and exact description of the same, reference being had to the annexed drawings, making a part of this specification, and to the letters of reference marked thereon.

This invention relates to certain new and useful improvements in fertilizer-distributers; and it has for its objects, among others, to provide an improved device of this character which can be readily attached to the rear end of an ordinary farm-wagon and operated from the axle thereof. A spring-held apron is provided, which is made adjustable. Suitable means is provided for throwing the device into or out of operation.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a longitudinal central vertical section showing my fertilizer attached to the rear of a wagon. Fig. 2 is a top plan with portions broken away. Fig. 3 is a vertical longitudinal section through the spreader detached.

Like letters of reference indicate like parts throughout the several views in which they occur.

Referring now to the details of the drawings by letter, A designates a portion of the body of what may be an ordinary farm-wagon, to the rear end of which my improved fertilizer is to be attached in any suitable manner, preferably so as to be readily detached when desired.

B is the hopper, without bottom, and beneath which is detachably secured the spreader C, which may be hinged at one side, as shown at $a$, and the opposite side provided with a suitable hook $b$ to engage a pin $c$ on the hopper, as shown in Fig. 1, to hold it in place. This spreader is provided with a double oppositely-inclined bottom $d$, as seen best in Fig. 3, the apex thereof being shown at $e$ in Fig. 1.

$f$ designates the discharge-openings of the spreader.

D is a horizontal shaft suitably journaled in the end walls of the hopper, and carrying at one end a sprocket-wheel E, which is designed to be operated by a belt, (shown by dotted lines,) and which is designed to pass over a sprocket-wheel (not shown) on the axle of the wagon, (not shown,) so that as the wheels of the wagon revolve the shaft D will be revolved. This shaft within the hopper is provided with a plurality of radial fingers $g$, as shown. On this shaft outside the hopper is a clutch G, which may be of any of the well-known forms, and designed to be actuated by the bifurcated lever H, which is fulcrumed at $h$ on the arm I, secured to the hopper, as seen best in Fig. 2. The sprocket-wheel is loose upon its shaft, but the clutch is fast thereon, so that when the clutch is engaged with the pins on the sprocket-wheel the sprocket-wheel will revolve with the shaft; but when the clutch is thrown out the said sprocket-wheel will not revolve.

J is another shaft journaled in the side walls of the hopper parallel with the shaft D, and provided with a plurality of like fingers $i$, the fingers on the two shafts being arranged to intermesh or pass between each other. The ends of the two shafts project beyond the end wall of the hopper and are provided with intermeshing gear-wheels K, as seen in Fig. 2, so that motion is imparted to the shaft J from the shaft D, as will be readily understood from Fig. 2.

K' is the apron arranged in an inclined direction at the rear end of the hopper and resting against the cleats $j$, which are attached to the inner walls of the ends of the hopper. This apron is provided at its lower edge with a plurality of slots or openings $k$, through which the fingers of the shaft J work, as seen in Fig. 2. The lower end of the apron rests upon springs L, which are seated in sockets in the cleats, as shown, and which serve to hold the apron toward the front with a yielding pressure, so as to permit it to yield in case of an obstruction which would otherwise tend to break some of the parts. To the rear side of the apron is attached a cross-bar $l$, in which is held one end of a screw M, the other end of which is screwed through a cross-bar N, which rests upon the tops of the cleats j and unattached to the apron, and the end of the screw passed through the same and provided with a thumb-screw m, as seen in Figs. 1 and 2, so that by turning the said thumb-screw the apron may be raised or lowered as may desired.

Within the hopper, near the lower end, upon the front wall of the hopper, is arranged a combing-plate O, provided with a plurality of openings p, through which the fingers of the shaft J work, as seen in Figs. 1 and 2.

The operation will be apparent from the foregoing description, when taken in connection with the annexed drawings, and a detailed description thereof is not deemed necessary.

The spreader or drill-chute may be provided with an adjustable bottom, so that it may be adjusted to drill to any desired width, and, if taken off, the machine will spread broadcast.

What is claimed as new is—

1. The combination, with the hopper and its shafts with their fingers, of the inclined cleats secured to the inner faces of the end walls of the hopper, the apron, the cross-bar thereon, the springs held between said inclined cleats and the under side of the apron near the lower end of the latter, the loose cross-bar resting upon the upper ends of the cleats, and the screw held in the rigid cross-bar and passed through the loose bar and provided with a thumb-screw, as set forth.

2. The combination, with the hopper and the detachable drill-chute, of the shafts provided with fingers within the hopper, the means for operating the shafts, the inclined spring-held and adjustable apron at the rear end of the hopper, the specified means for adjusting said apron, and the combing-plate within the hopper at the forward side thereof and provided with openings for the passage of the fingers on one of the shafts, as shown and described.

In testimony that I claim the above I have hereunto subscribed my name in the presence of two witnesses.

JOHN DAVIS BARRON.

Witnesses:
B. F. ELKIN,
H. W. GILSON.